Aug. 9, 1932.  C. A. MATSON  1,870,686
REVERSE BRAKE
Filed April 13, 1929
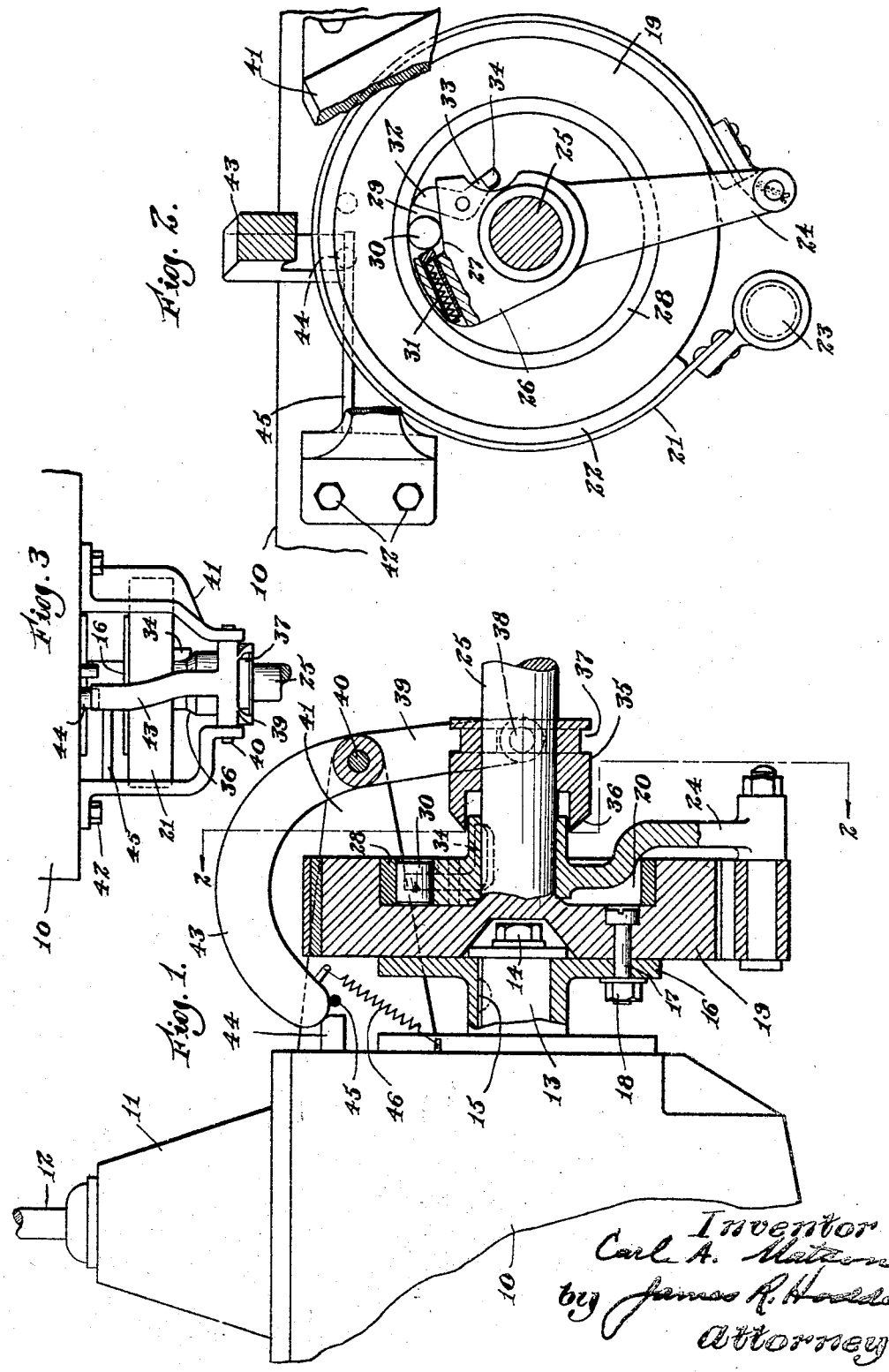

Patented Aug. 9, 1932

1,870,686

UNITED STATES PATENT OFFICE

CARL A. MATSON, OF LYNNFIELD, MASSACHUSETTS, ASSIGNOR TO THE MATSON COMPANY, OF CONCORD, NEW HAMPSHIRE, A CORPORATION OF NEW HAMPSHIRE

REVERSE BRAKE

Application filed April 13, 1929. Serial No. 354,836.

My present invention relates to power transmission systems, and more particularly to an improved brake mechanism for the transmission systems of automobiles or other motor driven vehicles.

In my copending application for patent on reverse brakes, Serial No. 411,016, filed November 27, 1929, I have described and claimed an improved brake mechanism for the transmission systems of automobiles or other automotive vehicles and the invention of present application is an improved application of the invention of such copending application.

In practicing my present invention, I have utilized means which may be operated by the emergency brake lever or by the foot clutch or foot brake and which will act to place the transmission mechanism in such condition upon stopping as to prevent positively any undesired rearward movement of the vehicle to which it is applied and which, when it is desired to reverse the motion of the vehicle, places the mechanism in position where such may be accomplished as readily as if the car were not equipped with such device.

The object of my invention, therefore, is an improved brake mechanism for automobiles and the like.

In the accompanying drawing illustrating the preferred embodiment of my invention Fig. 1 is a side elevation partly in section;

Fig. 2 is a section on the line 2—2 of Fig. 1, and

Fig. 3 is a partial plan view of Fig. 1.

Referring to the drawing, there is shown a transmission casing 10 having a top 11 thereon in which is pivotally mounted the transmission gearing operating lever 12, and extending rearwardly from such casing is the usual power shaft 13. Secured to the rear end of the power shaft 13 by bolt 14 and key 15 is a flange 16. Secured to the rear face of the flange 16 by bolts 17 and nuts 18 is a cylindrical member 19 which is recessed on its rear face, as indicated at 20. Surrounding the outer periphery of the cylindrical member 19 is a flexible brake band 21 lined with the usual and ordinary brake lining 22, one end of which is pivotally mounted on a stud 23 secured in any convenient manner to the casing 10. To the other free end of the flexible member 21 is pivotally mounted one end of the lever 24, which lever is rotatably mounted on an auxiliary power shaft 25 that is formed integrally with and extends rearwardly from the rear central portion of the cylindrical member 19. The auxiliary power shaft 25 is attached in the usual and ordinary way to the propeller shaft (not shown) of the motor vehicle to which the device is assumed to be attached. The lever 24 has an upward extension 26 thereon on which is formed a face 27 and which co-operates with an annular steel lining 28 secured in the cylindrical recess 20 to form a tapered wedge-shaped recess 29 in which is mounted a roller 30. The extended portion 26 of the lever 24 adjacent the roller 30 is provided with a spring pressed plunger 31 which engages with the roller 30 and forces the same to the right, as viewed in Fig. 2, or into position to engage with the face 27 and the inner periphery of the steel lining 28 simultaneously. Also, pivotally mounted on the extension 26 is a bell crank lever, one arm 32 of which is adapted to be brought into engagement with the roller 30 and forces or holds such roller to the left, as viewed in Fig. 2, and the other arm 33 of such bell crank lever is provided with a rearwardly extending portion 34 that lies spaced apart from but parallel to the auxiliary shaft 25. In the rear of the hub of the lever 24 is a cylindrical member 35 which is provided on its forward face with a bevelled portion 36 adapted to be engaged by the rearwardly extending member 34 to rotate the bell crank lever on which such rearwardly extending member is formed in a counter-clockwise direction, as viewed in Fig. 2, so as to bring the arm 32 of such bell crank lever into engagement with and force the roller 32 to the left, as viewed in Fig. 2. Formed in the rear end of the member 35 is an annular groove 37 in which fit the inwardly projecting pins 38 secured to the ends of a forked member 39 that are formed as one arm of a bell crank lever pivotally mounted on a shaft 40 secured to brackets 41 that are, in turn, attached to the rear of the casing 10 by bolts 42. The other arm 43 of the bell crank lever that is pivoted on the shaft 40 has its forward free end in position to be engaged by the rear end of the rod 44, that in turn is operated or moved rearwardly by the gear operating lever 12 when the reverse gears are put in mesh. The forward end of the arm 43 normally rests on a pin 45 secured to the casing 10 in any convenient manner and is yieldingly held in engagement therewith by the spring 46 that is attached at one end to the arm 43 and at the other end to the casing 10. The parts of the device are normally in the position shown in the drawing and, therefore, while ordinary or counter-clockwise rotation of the auxiliary power shaft 25 and the propeller shaft (not shown) associated therewith is permitted, such rotation merely tends to move the roller 30 into position to be out of engagement with either the surface 27 or the inner periphery of the steel lining 28. Yet if the automobile to which the device is attached is brought to rest and the automobile starts to move rearwardly, such rearward movement will cause a rotation of the cylindrical member 19 in a clockwise direction, forcing the roller 30 into position to engage both the inner periphery of the steel lining 28 and the surface 27 on the lever 24 simultaneously. The wedging action of the roller 30 on the face 27 of the lever 24 will cause a slight rocking action of the lever 24 about the shaft 25 in a clockwise direction. The brake drum 21 and brake lining 22, being fixed to the free end of the lever 24, will thus be clamped about the member 19, because of the fact that said brake drum is fixed at 23. Thus, a double braking action will be effected upon the member 19 and hence upon the shafts 13 and 25. One of these braking actions will be effected by the gripping of the brake lining 22 on the outer periphery of the member 19 and the other braking action will be effected by the roller 30 as it is wedged between the face 27 and the inner periphery of the steel lining 28. Thus an effective braking action is created, locking both the auxiliary power shaft 25 and the propeller shaft, and hence the wheels of the vehicle, against unintentional reverse rotation, thus preventing undesired retrograde movement of the vehicle.

If, however, it is desired to place the motor vehicle in reverse to move the motor vehicle in a rearward direction, the gear operating lever 12 is operated to bring the reverse gearing contained in the casing 10 into mesh and as a result thereof, the rod 44 is moved to the right, as shown in Fig. 1, or rearwardly, as viewed in Fig. 2, bringing the end thereof in engagement with the free end of the arm 43 of the bell crank lever that is pivotally mounted on the shaft 40, whereupon the cylindrical member 35 is moved forwardly or to the left, as viewed in Fig. 1, to bring the bevelled face 36 thereof into engagement with the rearwardly projecting member 34 of the bell crank lever, thus bringing the arm 32 of such bell crank lever into engagement with the roller 30 and forcing such roller to the left, as viewed in Fig. 2 or into position where it will be impossible for such roller to exert a locking action on the auxiliary power shaft 25. Therefore, with my device it will be impossible for the automobile to move rearwardly unless such rearward movement is desired, and the act of carrying out this latter desire automatically places the parts of the device in position to permit such reverse movement to take place. Immediately, however, that the operating lever is moved to throw the gearing out of reverse, the member 44 moves forwardly out of engagement with the arm 43 and the spring 46 immediately acts to cause a movement of the cylindrical member 35 to the right, as shown in Fig. 1, or into position to bring the bevelled face 36 thereof out of engagement with the rearwardly extending member 34 and the member 32 of the bell crank lever moves to the right, as shown in Fig. 2, and allows the roller 30 to again come into operative relation with respect to the surface 27 and the inner face of the steel lining or ring 28.

While I have necessarily shown the preferred embodiment of my invention, somewhat in detail, it is to be understood that I may vary the size, shape, and arrangement of parts within wide limits without departing from the spirit of the invention.

Having thus described my invention, what I claim as new is:

1. In a device of the kind described, the combination of a driving member, a driven member adapted to be rotated in either direction by the driving member, a brake drum mounted on said driven member, a brake band associated with the brake drum, a brake lining carried by said band, a lever mounted on the driven member and operably connected to the brake band, and locking means associated with the lever for operating the same to prevent rotary movement of the driven member in one direction.

2. In a device of the kind described, the combination of a driving member, a driven member adapted to be rotated in either direction by the driving member, a brake drum mounted on said driven member, a brake band associated with the brake drum, a brake lining carried by said band, a lever mounted on the driven member and operably connected to the brake band, locking means associated with the lever for operating the same to prevent rotary movement of the driven member in one direction, and means operable at will for disassociating the locking means from the lever to thereby permit rotary movement of the driven member in either direction.

3. In a device of the kind described, a driving member, a driven member adapted to be rotated in either direction by the driving member, a brake band partially enclosing said driven member, a brake lining interposed between said band and said driven member, a lever mounted on the driven member and operably connected to the brake band, and means to operate said lever to clamp said brake band on said driven member to prevent rotary movement of said driven member in one direction.

4. In a device of the kind described, a driving member, a driven member adapted to be rotated in either direction by the driving member, a brake band partially enclosing said driven member, a brake lining interposed between said band and said driven member, a lever mounted on the driven member and operably connected to the brake band, means to operate said lever to clamp said brake band on said driven member to prevent rotary movement of said driven member in one direction, and means operable upon said first named means to prevent operation of said lever to thereby permit rotary movement of the driven member in either direction.

5. In a device of the kind described, a driving member, a driven member adapted to be rotated in either direction by the driving member, a brake band partially enclosing said driven member, a brake lining interposed between said band and said driven member, a lever mounted on the driven member and operably connected to the brake band, means to operate said lever to clamp said brake band on said driven member to prevent rotary movement of said driven member in one direction, and means automatically operable upon said first named means to prevent operation of said lever to thereby permit rotary movement of the driven member in either direction.

6. In a device of the kind described, a driving member, a driven member adapted to be rotated in either direction by the driving member and having a recess therein, a brake band partially enclosing said driven member, a brake lining interposed between said band and said driven member, a lever mounted on the driven member and operably connected on the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction.

7. In a device of the kind described, a driving member, a driven member adapted to be rotated in either direction by the driving member and having a recess therein, a brake band partially enclosing said driven member, a brake lining interposed between said band and said driven member, a lever mounted on the driven member and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, and means operable on said roller to prevent movement of said roller toward the reduced end of said chamber, whereby said driven member is free to rotate in either direction.

8. In a device of the kind described, a driving member, a driven member adapted to be rotated in either direction by the driving member and having a recess therein, a brake band partially enclosing said driven member, a brake lining interposed between said band and said driven member, a lever mounted on the driven member and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, and means automatically operable on said roller to prevent movement of said roller toward the reduced end of said chamber, whereby said driven member is free to rotate in either direction.

9. In a device of the kind described, a driving member, a driven member adapted to be rotated in either direction by the driving member and having a recess therein, a brake band partially enclosing said driven member, a brake lining interposed between said band and said driven member, a lever mounted on the driven member and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said first lever, one end of said bell crank lever projecting into said chamber, and means operable on said bell crank lever against said roller to maintain said roller in inoperative position.

10. In a device of the kind described, a driving member, a driven member adapted to be rotated in either direction by the driving member and having a recess therein, a shaft carried by said driven member, a brake band partially enclosing said driven member, a brake lining interposed between said band and said driven member, a lever mounted on said shaft and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said lever, one end of said bell crank lever projecting into said chamber, a sleeve mounted on said shaft, and means to slide said sleeve along said shaft whereby said sleeve will engage the other end of said bell crank lever, rocking the same to move the projecting end of said bell crank lever against said roller to maintain said roller in inoperative position.

11. In a device of the kind described, a driving member, a driven member adapted to be rotated in either direction by the driving member and having a recess therein, a shaft carried by said driven member, a brake band partially enclosing said driven member, a brake lining interposed between said band and said driven member, a lever mounted on said shaft and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said lever, one end of said bell crank lever projecting into said chamber, a sleeve mounted on said shaft, said sleeve having a beveled forward end, a laterally extending member on said bell crank lever, and means to slide said sleeve along said shaft whereby the beveled end of said sleeve will engage said laterally extending member and rock said bell crank lever, moving the projecting end of said bell crank lever against said roller to maintain said roller in inoperative position.

12. In a device of the kind described, a driving member, a driven member adapted to be rotated in either direction by the driving member and having a recess therein, a shaft carried by said driven member, a brake band partially enclosing said driven member, a brake lining interposed between said band and said driven member, a lever mounted on said shaft and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said lever, one end of said bell crank lever projecting into said chamber, a sleeve mounted on said shaft, said sleeve having a beveled forward end, a laterally extending member on said bell crank lever, said sleeve having an annular groove therein, a pivotally mounted arm, a yoke on said arm, inwardly projecting members on said yoke in engagement with said groove, and means to normally hold said sleeve out of engagement with the laterally extending member.

13. In a device of the kind described, a driving member, a driven member adapted to be rotated in either direction by the driving member and having a recess therein, a shaft carried by said driven member, a brake band partially enclosing said driven member, a brake lining interposed between said band and said driven member, a lever mounted on said shaft and operably connected to the brake band, one end of said lever being located in said recess, said lever having a cutaway portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said lever, one end of said bell crank lever projecting into said chamber, a sleeve mounted on said shaft, said sleeve having a beveled forward end, a laterally extending member on said bell crank lever, said sleeve having an annular groove therein, a pivotally mounted arm, a yoke on said arm, inwardly projecting members on said yoke in engagement with said groove, and resilient means to normally hold said sleeve out of engagement with the laterally extending member.

14. In a device of the kind described, a driving member, a driven member adapted to be rotated in either direction by the driving member and having a recess therein, a shaft carried by said driven member, a brake band partially enclosing said driven member, a brake lining interposed between said band and said driven member, a lever mounted on said shaft and operably connected to the brake band, one end of said lever being located in said recess, said lever having a cut away portion defining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said lever, one end of said bell crank lever projecting into said chamber, a sleeve mounted on said shaft, said sleeve having a beveled forward end, a laterally extending member on said bell crank lever, said sleeve having an annular groove therein, a pivotally mounted arm, a yoke on said arm, inwardly projecting members on said yoke in engagement with said groove, means to normally hold said sleeve out of engagement with the laterally extending member, and means to rock said arm, thus sliding said sleeve along said shaft and bringing the beveled end of said sleeve into engagement with the laterally extending member on said bell crank lever, rocking said bell crank lever to move the projecting end thereof against said roller to maintain said roller in inoperative position.

15. In a device of the kind described, a driving member, a driven member adapted to be rotated in either direction by the driving member and having a recess therein, a shaft carried by said driven member, a brake band partially enclosing said driven member, a brake lining interposed between said band and said driven member, a lever mounted on said shaft and operably connected to the brake band, one end of said lever being located in said recess, said lever having a cut away portion dfining with the periphery of said recess a wedge-shaped chamber, a roller in said chamber, rotation of said driven member in one direction moving said roller toward the reduced end of said chamber, such movement of said roller rocking said lever and clamping said brake band on said driven member to prevent rotary movement of said driven member in said direction, a bell crank lever pivotally mounted on said lever, one end of said bell crank lever projecting into said chamber, a sleeve mounted on said shaft, said sleeve having a beveled forward end, a laterally extending member on said bell crank lever, said sleeve having an annular groove therein, a pivotally mounted arm, a yoke on said arm, inwardly projecting members on said yoke in engagement with said groove, resilient means to normally hold said sleeve out of engagement with the laterally extending member, and means to rock said arm, thus sliding said sleeve along said shaft and bringing the beveled end of said sleeve into engagement with the laterally extending member on said bell crank lever, rocking said bell crank lever to move the projecting end thereof against said roller to maintain said roller in inoperative position.

In testimony whereof, I have signed my name to this specification.

CARL A. MATSON.